Dec. 5, 1961 G. E. PELLISSIER ET AL 3,012,140
APPARATUS FOR MEASURING THE THICKNESS
OF A COATING ON A BASE MATERIAL
Filed Jan. 28, 1959 2 Sheets-Sheet 2
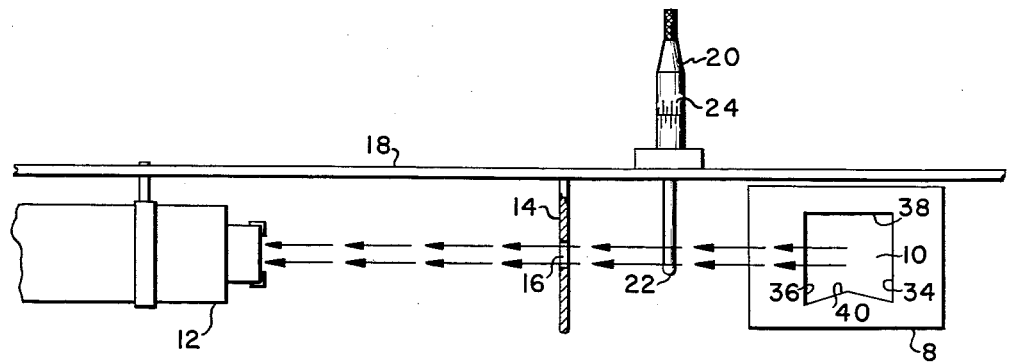
FIG_2
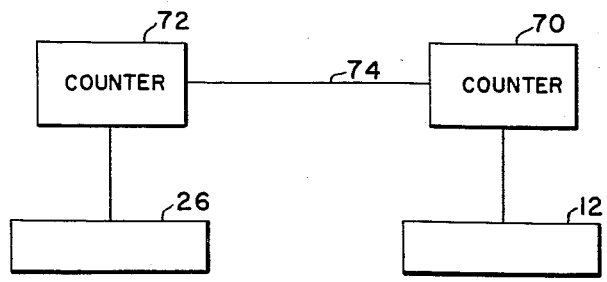
FIG_3
INVENTORS
GEORGE E. PELLISSIER
BARTHOLOMEW G. REISDORF
EVERETT E. WICKER
by Donald G. Dalton
attorney

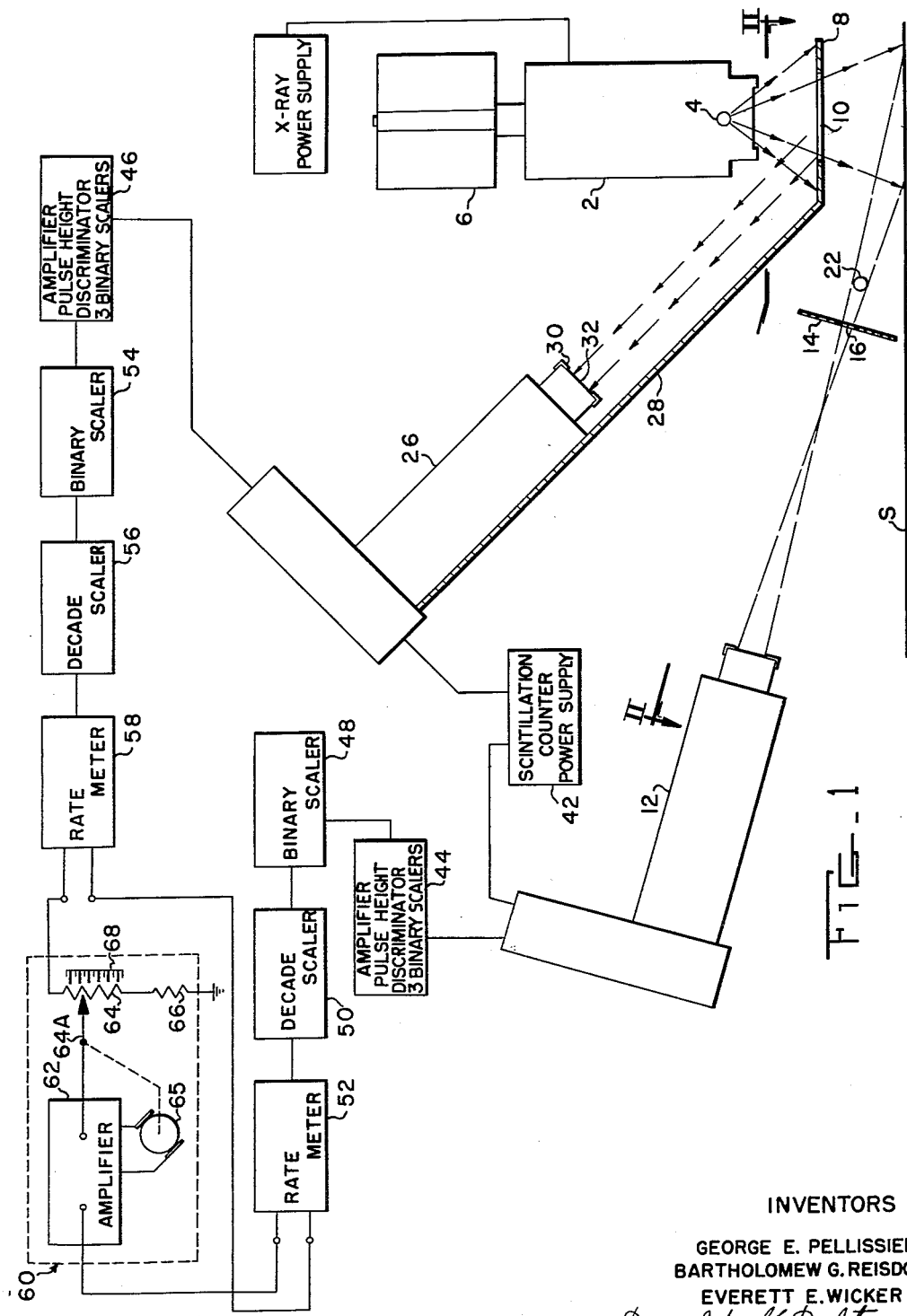

United States Patent Office 3,012,140
Patented Dec. 5, 1961

3,012,140
APPARATUS FOR MEASURING THE THICKNESS OF A COATING ON A BASE MATERIAL
George E. Pellissier, Franklin Township, Westmoreland County, Bartholomew G. Reisdorf, Penn Township, Allegheny County, and Everett E. Wicker, Wilkinsburg, Pa., assignors to United States Steel Corporation, a corporation of New Jersey
Filed Jan. 28, 1959, Ser. No. 789,679
3 Claims. (Cl. 250—51.5)

This invention relates to apparatus for measuring the thickness of a coating on a base material and is a continuation-in-part of my copending application, Serial No. 678,160, now abandoned filed August 14, 1957. The invention relates particularly to the continuous measurement of tin coating on a moving steel strip. X-ray gages for this purpose have been proposed such as shown in McCartney et al. Patent No. 2,578,722 and Webster Patent No. 2,763,784. However, these gages have the disadvantage that they are extremely sensitive to the changes in the distance between the strip and the gage head. This is particularly true when using the most sensitive geometry for measurement of coating thickness. In tin coating measurement the most sensitive geometry is such that the angle between the material being gaged and the radiation counter is between 5 and 30°. Also, the arrangement of the parts in the previous gages was such that the X-ray tube used had to be a relatively great distance from the specimen so that the tube had to be relatively large and operated at high power input to obtain the necessary intensity of radiation. This required external cooling means for the X-ray tube and high voltage power supply. The equipment necessary for cooling was expensive and difficult to install and maintain. Also, uncontrollable variations in the intensity of emission from the X-ray tube caused erroneous readings. In order to obtain correct readings it was necessary either to manually insert standard samples in the gage frequently and make the necessary adjustments to the gage to compensate for these uncontrollable variations or to use very complicated and delicate equipment to automatically compensate for such variations.

It is therefore an object of our invention to provide an X-ray coating thickness gage which includes non-complex means for accurately and automatically compensating for uncontrollable variations in intensity of emission from the X-ray tube.

Another object is to provide such a gage which is so designed that the X-ray tube can be located relatively close to the specimen.

Still another object is to provide such a gage which will operate satisfactorily regardless of changes in the distance between the specimen and the gage head.

These and other objects will be more apparent after referring to the following specification and attached drawings, in which:

FIGURE 1 is a schematic view of the X-ray gage of our invention;

FIGURE 2 is a view taken on the line II—II of FIGURE 1; and

FIGURE 3 is a schematic view of a second embodiment of our invention.

Referring more particularly to FIGURES 1 and 2 of the drawings, the reference numeral 2 indicates an X-ray tube which may be a Machlett EG–25 tube having a tungsten target 4 from which X-rays radiate. The tube 2 may be cooled by means of a cooling fin 6 if found necessary. The purpose of the cooling fin 6 is to provide increased radiating surface to dissipate the heat generated in the anode of tube 2. In most cases the fin 6 will not be necessary. A diaphragm 8 is arranged beneath the tube 2 generally normal to the axis of X-ray tube 2 and has an opening 10 therethrough. The diaphragm 8 may be made of any material which is capable of stopping X-rays but is preferably of the same material as that of the strip S being gaged. The invention is particularly suitable for gaging tin coating on a moving steel strip. A radiation counter 12 is arranged above the path of travel of the strip S at an angle thereto. For normal thicknesses of tin coating generally obtained by electrolytic tinning this angle is preferably about 16°. The radiation counter may be a Geiger counter, but is preferably a scientillation counter. A baffle 14 made of steel or other material capable of stopping X-rays is provided between the radiation counter 12 and the strip beneath the X-ray tube 2. A slit 16 is provided in the baffle 14 to permit passage of and to limit the line of sight of X-rays to the radiation counter 12. A frame 18 supports the baffle 14 and also supports a depth micrometer 20 having a shaft 22 which extends into the path of travel of the X-rays to the radiation counter. The micrometer 20 has the usual scale 24 which indicates the distance that the shaft 22 extends into the path of the X-rays. A second radiation counter 26 similar to radiation counter 12 is mounted on a shield 28 which may be an extension of diaphragm 8. As shown this radiation counter 26 is arranged at an angle 45° with the strip S. Shielding 30 may be placed around aperture 32 of radiation counter 26 to adjust the amount of radiation viewed by it at any given time. When gaging the coating on a stationary specimen the opening 10 is shaped to give the desired irradiated area on the specimen. However, when determining the coating thickness on a moving strip the shape of the opening 10 is important in order to provide for constant reading regardless of the normal movement of the strip S in a vertical direction. The shape of the opening 10 must be such that the area of irriadiated strip viewed by the radiation counter 12 times the average intensity of the X-ray beam over that area is constant regardless of the position of the strip. The simplest form of opening for this purpose is shown in FIGURE 2 wherein the opening 10 has parallel sides 34 and 36 normal to the axis of the radiation counter 12, a side 38 perpendicular to sides 34 and 36 and a generally V-shaped side 40. Thus, the length of the opening 10 normal to the axis of radiation counter 12 is minimum directly below the target 4 and increases outwardly in both directions. The shape of opening 10 may vary, such as by making the side 38 similar to side 40, as long as the relationship of area of irradiated strip viewed times the average intensity of X-ray beam over that area remains a constant. If this relationship is not maintained, the gage will be very sensitive to changes in distance between the strip and gage head. The reason for this is that the position of the area viewed by detector 12 varies with respect to the axis of the X-ray tube as the elevation of the strip varies with resultant changes in total intensity of the X-rays measured over the area of the strip viewed. Power for the radiation counters 12 and 26 is provided from the power supply 42. The output of radiation counter 12 is fed to a unit 44 which consists of an amplifier, a pulse height discriminator and three binary scalers in series. This is a commercial unit available from various sources including Philips Electronics, Inc. as shown in their catalog 42234. A similar unit 46 is connected to the radiation counter 26. The output of unit 44 is fed through a binary scaler 48 to a decade scaler 50 and then to a rate meter 52. The output of the unit 46 is fed through a similar binary scaler 54 and a similar decade scaler 56 to a similar rate meter 58. The outputs of meters 52 and 58 are fed to a ratio recorder 60. The ratio recorder 60 is a standard potentiometer recorder modified so that its chart will give a reading corresponding to a ratio of the signals from rate meters 52 and 58. The recorder 60 consists generally of an amplifier 62 connected to meter 52, a slide wire resistor 64 having its arm 64A electrically connected to the amplifier 62 and mechanically connected to a motor 65 which is electrically connected to amplifier 62. The motor 65 also drives the pen (not shown) associated with the recorder chart. A resistor 66 is connected in series with slide wire resistor 64. The slide wire resistor 64 is connected to meter 58 instead of the standard battery used in a standard potentiometer recorder. Other standard equipment may be used for determining the ratio between the outputs of radiation counters 12 and 26.

The operation of our device is as follows:

As the strip S passes beneath the X-ray tube 2 the X-rays from the tube 2 pass through the opening 10 to the strip S and through the tin coating to the steel base. The fluorescent radiation from the steel base passes through the tin coating with a portion thereof passing through the slit 16 to the radiation counter 12. At the same time a portion of the X-rays strikes the diaphragm 8 and the fluorescent radiation therefrom passes upwardly through the slot 32 to the radiation counter 26. The outputs of the radiation counters 12 and 26 are fed to the ratio recorder 60 and the ratio obtained. The signals from meters 52 and 58 are in the form of voltages with the voltage from meter 52 being fed to amplifier 62 where it is compared with the voltage at the arm 64A which last voltage is a function of the voltage from meter 58. If the voltage from the two meters 52 and 58 do not balance the amplifier 62 provides a signal to motor 65 causing it to move arm 64A until the voltages do balance. When measuring the thickness of a tin coating on steel the value of resistor 66 is chosen so that the value on scale 68 adjacent resistor 66 will indicate the thickness of the heaviest coating to be measured and the value at the opposite end will indicate the lightest coating to be measured. The scale 68 is calibrated to read in thickness of coating and the calibration is obtained by placing samples having known coating weights in the gage and determining the position of the arm 64A for all coating weights between the minimum and maximum coatings to be measured. The output of meter 58 can be originally set for any desired value for best operation of the ratio recorder 60. Once the instrument is set up and calibrated the output of meter 58 will vary as the output of the X-ray tube 2 varies while the output of meter 52 will vary as the output of X-ray tube 2 varies and also as the thickness of the coating varies. Thus, the ratio recorder 60 compares the outputs of the counters 12 and 26 for a common time interval so as to compensate for changes in the output of the X-ray tube 2. The ratio obtained and recorded bears a logarithmic relation to the thickness of the tin coating on the tin plate. By using a suitably graduated non-linear chart paper the reading may be made directly in units of coating thickness or weight. The purpose of the radiation counter 26 is to compensate for uncontrollable variations in the intensity of emission from the X-ray tube 2 so that the reading will be constant for constant coating thicknesses regardless of variations in power input to the X-ray tube. However, it will be understood that this desirable feature could be omitted and the output of the radiation counter 12 measured to determine the coating thickness.

Means other than those shown may be used to determine the ratio between the output of the radiation counters 12 and 26. For example, a pulse counter may be connected to each of the radiation counters 12 and 26 and interconnected so that when the first pulse counter is started the second pulse counter also starts and when the first counter accumulates a certain count both counters will stop. This is shown in FIGURE 3 where the radiation counter 12 is connected to a pulse counter 70 and radiation counter 26 to a pulse counter 72, counters 70 and 72 being interconnected electrically by means of a cable 74. In this species of our invention the counter 72 is set so as to obtain any preset count. Then when counter 72 starts counting, counter 70 will also start counting. When the preset count is obtained on counter 72, both counters 70 and 72 will stop. For example, if counter 72 is set to count to 1000 the count on counter 70 will indicate a ratio between the outputs of radiation counters 12 and 26. Calibration is by inserting standard samples as in the first species. Once the instrument is set up and calibrated, the time the counters 70 and 72 operate will vary inversely as the output of X-ray tube 2 varies and the variation in the output of X-ray tube 2 will have no effect on the ratio of the counts. Thus, the counters 70 and 72 compare the outputs of counters 12 and 26 for a common time interval so as to compensate for changes in the output of the X-ray tube 2.

In order to calibrate and adjust the gage so that a coating of a given thickness produces the same count every day the depth micrometer 20 is adjusted to move its shaft 22 so as to vary the amount of radiation viewed by detector 12. When it is determined that the count is too high the shaft 22 is inserted further into the beam and when too low the shaft is withdrawn.

While several embodiments of our invention have been shown and described it will be apparent that other adaptations and modifications may be made without departing from the scope of the following claims.

We claim:

1. Apparatus for continuously measuring the thickness of a coating on a moving steel strip comprising an X-ray tube located adjacent the path of travel of the strip, an iron containing diaphragm between the strip and said X-ray tube, said diaphragm having an opening therein permitting passage of X-rays, means mounted on the same side of the strip as said X-ray tube for measuring fluorescent radiation from said diaphragm, means mounted on the same side of the strip as said X-ray tube for measuring fluorescent radiation from said strip, means for directing fluorescent radiation from said strip to said second radiation measuring means, a first rate meter connected to the output of said first radiation measuring means, a second rate meter connected to the output of said second radiation measuring means, a voltage recorder having a variable voltage biasing means, means connecting the output of said first rate meter to the variable voltage biasing means, and means connecting the output of said second rate meter to said recorder in opposition to the bias voltage.

2. Apparatus for continuously measuring the thickness of a coating on a moving strip comprising an X-ray tube located adjacent the path of travel of the strip, a diaphragm between the strip and said X-ray tube, said diaphragm being made of material capable of stopping X-rays, means mounted on the same side of the strip as said X-ray tube for measuring fluorescent radiation from said strip, and means between said strip and radiation measuring means for limiting the angle of sight of fluorescent X-rays from said strip to said first named means, said diaphragm having an opening therein with the length of the opening normal to the axis of said fluorescent radiation measuring means being a minimum directly below the target of the X-ray tube and increasing outwardly in both directions in such manner that the area of irradiated strip viewed by said first named means times the average intensity of the X-ray beam over that area remains substantially constant regardless of the changes in distance between the strip and X-ray tube.

3. Apparatus for continuously measuring the thickness of a coating on a moving steel strip comprising an X-ray tube located adjacent the path of travel of the strip, an iron containing diaphragm between the strip and said X-ray tube, said diaphragm having an opening therein permitting passage of X-rays, means mounted on the same side of the strip as said X-ray tube for measuring fluorescent radiation from said diaphragm, means mounted on the same side of the strip as said X-ray tube for measuring fluorescent radiation from said strip, means between said strip and said second radiation measuring means for limiting the angle of sight of fluorescent X-rays from said strip to said second radiation measuring means, said diaphragm having an opening therein with the length of the opening normal to the axis of said second fluorescent radiation measuring means being a minimum directly below the target of the X-ray tube and increasing outwardly in both directions in such manner that the area of irradiated strip viewed by said first named means times the average intensity of the X-ray beam over that area remains substantially constant regardless of the changes in distance between the strip and X-ray tube, a first rate meter connected to the output of said first radiation measuring means, a second rate meter connected to the output of said second radiation measuring means, a voltage recorder having a variable voltage biasing means, means connecting the output of said first rate meter to the variable voltage biasing means, and means connecting the output of said second rate meter to said recorder in opposition to the bias voltage.

References Cited in the file of this patent

UNITED STATES PATENTS

| | | |
|---|---|---|
| 2,542,022 | Friedman | Feb. 20, 1951 |
| 2,647,214 | Penney et al. | July 28, 1953 |
| 2,763,784 | Webster | Sept. 18, 1956 |
| 2,829,262 | Hamacher | Apr. 1, 1958 |
| 2,848,624 | Friedman et al. | Aug. 19, 1958 |

FOREIGN PATENTS

| | | |
|---|---|---|
| 506,022 | Great Britain | May 22, 1939 |